US012597660B2

(12) United States Patent
Lee et al.

(10) Patent No.: US 12,597,660 B2
(45) Date of Patent: Apr. 7, 2026

(54) BATTERY MODULE AND METHOD OF MANUFACTURING THE SAME

(71) Applicant: LG ENERGY SOLUTION, LTD., Seoul (KR)

(72) Inventors: Changje Lee, Daejeon (KR); Dae Ji Hong, Daejeon (KR); Hanjong Yoon, Daejeon (KR); Kangil Lee, Daejeon (KR); Seung Hwan Bae, Daejeon (KR); Jaehyun Bae, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 787 days.

(21) Appl. No.: 17/791,164

(22) PCT Filed: Apr. 9, 2021

(86) PCT No.: PCT/KR2021/004462
§ 371 (c)(1),
(2) Date: Jul. 6, 2022

(87) PCT Pub. No.: WO2021/206493
PCT Pub. Date: Oct. 14, 2021

(65) Prior Publication Data
US 2023/0344052 A1    Oct. 26, 2023

(30) Foreign Application Priority Data

Apr. 10, 2020    (KR) ........................ 10-2020-0043764
Apr. 8, 2021    (KR) ........................ 10-2021-0045796

(51) Int. Cl.
*H01M 50/211*    (2021.01)
*H01M 50/209*    (2021.01)
(Continued)

(52) U.S. Cl.
CPC ....... *H01M 50/211* (2021.01); *H01M 50/209* (2021.01); *H01M 50/224* (2021.01);
(Continued)

(58) Field of Classification Search
None
See application file for complete search history.

(56) References Cited

U.S. PATENT DOCUMENTS 6,264,708 B1    7/2001    Haraguchi et al.
6,627,348 B1    9/2003    Haraguchi et al.
(Continued)

FOREIGN PATENT DOCUMENTS

CN    1287692 A    3/2001
CN    1750309 A    3/2006
(Continued)

OTHER PUBLICATIONS

Machine Translation of CN-207883791-U (Year: 2018).*
(Continued)

*Primary Examiner* — Gregg Cantelmo
(74) *Attorney, Agent, or Firm* — Birch, Stewart, Kolasch & Birch, LLP

(57) ABSTRACT

A battery module includes a first member and a second member that are coupled in directions that cross each other, wherein the first member and the second member are weld-coupled; a welding portion of the first member and the second member includes a first welding portion formed on the first member and a second welding portion formed on the second member, based on a coupling surface of the first member and the second member; and the first welding portion and the second welding portion have shapes that are asymmetric to each other.

12 Claims, 9 Drawing Sheets

(51) Int. Cl.

| | |
|---|---|
| *H01M 50/224* | (2021.01) |
| *H01M 50/244* | (2021.01) |
| *H01M 50/249* | (2021.01) |
| *H01M 50/271* | (2021.01) |
| *H01M 50/276* | (2021.01) |

(52) U.S. Cl.
CPC ....... *H01M 50/244* (2021.01); *H01M 50/249* (2021.01); *H01M 50/271* (2021.01); *H01M 50/276* (2021.01)

(56) References Cited

U.S. PATENT DOCUMENTS

| | | | |
|---|---|---|---|
| 2006/0035143 A1 | 2/2006 | Kida et al. | |
| 2011/0095003 A1 | 4/2011 | Sakurai et al. | |
| 2011/0117409 A1 | 5/2011 | Lee et al. | |
| 2013/0040172 A1* | 2/2013 | Chen .................... | H01M 50/30 429/82 |
| 2015/0183058 A1 | 7/2015 | Sugiyama et al. | |
| 2015/0349303 A1* | 12/2015 | Umeyama .............. | B23K 26/20 219/121.64 |
| 2015/0360320 A1 | 12/2015 | Yoshida et al. | |
| 2016/0197334 A1 | 7/2016 | Ueda et al. | |
| 2016/0211491 A1 | 7/2016 | Iwasaki et al. | |
| 2016/0218329 A1 | 7/2016 | Ueda et al. | |
| 2016/0240828 A1 | 8/2016 | Ueda et al. | |
| 2018/0311768 A1 | 11/2018 | Tsukui | |
| 2019/0006647 A1 | 1/2019 | Ryu et al. | |
| 2021/0184306 A1 | 6/2021 | Baek et al. | |
| 2021/0213563 A1 | 7/2021 | Tsukui | |

FOREIGN PATENT DOCUMENTS

| | | | |
|---|---|---|---|
| CN | 108475745 A | | 8/2018 |
| CN | 207883791 U | * | 9/2018 |
| CN | 209447871 U | | 9/2019 |
| EP | 0 933 159 A1 | | 8/1999 |
| EP | 0 942 476 A1 | | 9/1999 |
| JP | 7-272701 A | | 10/1995 |
| JP | 8-77983 A | | 3/1996 |
| JP | 11-307065 A | | 11/1999 |
| JP | 2000-21365 A | | 1/2000 |
| JP | 2000-133211 A | | 5/2000 |
| JP | 2003-181666 A | | 7/2003 |
| JP | 2006-54266 A | | 2/2006 |
| JP | 2011-92944 A | | 5/2011 |
| JP | 2013-91085 A | | 5/2013 |
| JP | 2015-11948 A | | 1/2015 |
| JP | 2015-76204 A | | 4/2015 |
| JP | 2015-163410 A | | 9/2015 |
| JP | 2016-2562 A | | 1/2016 |
| JP | 2019-502250 A | | 1/2019 |
| KR | 2000-0069172 A | | 11/2000 |
| KR | 10-2016-0064083 A | | 6/2016 |
| KR | 10-2018-0121384 A | | 11/2018 |
| WO | WO 00/25374 A1 | | 5/2000 |
| WO | WO 2013/186862 A1 | | 12/2013 |
| WO | WO 2020/071833 A1 | | 4/2020 |

OTHER PUBLICATIONS

European Communication persuant to Article 94(3) EPC for European Application No. 21 785 499.1. dated Feb. 4, 2025.
International Search Report for PCT/KR2021/004462 (PCT/ISA/210) mailed on Aug. 6, 2021.
Extended European Search Report for European Application No. 21785499.1, dated May 7, 2024.
European Communication pursuant to Article 94(3) EPC for European Application No. 21785499.1, dated Oct. 20, 2025.

* cited by examiner

Conventional Art

Conventional Art

BATTERY MODULE AND METHOD OF MANUFACTURING THE SAME

TECHNICAL FIELD

Cross-Reference to Related Application(s)

This application claims priority to and the benefit of Korean Patent Application No. 10-2020-0043764 filed in the Korean Intellectual Property Office on Apr. 10, 2020, and Korean Patent Application No. 10-2021-0045796 filed in the Korean Intellectual Property Office on Apr. 8, 2021, the entire contents of which are incorporated herein by reference.

The present invention relates to a battery module and a method and of manufacturing the same, and more specifically, to a battery module and a method of manufacturing the same that may prevent spatter from being introduced due to welding.

Background Art

Rechargeable batteries having high application characteristics and electrical characteristics such as high energy density according to their products are widely applied to battery vehicles, hybrid vehicles, and electric power storage devices driven by electric driving sources, as well as portable devices. These rechargeable batteries are attracting attention as new energy sources for improving environmental friendliness and energy efficiency in that they do not generate any by-products of energy use, as well as their primary merit, that they can drastically reduce the use of fossil fuels.

One or a couple of battery cells per device are used for small mobile devices, whereas medium and large devices such as automobiles require high power/large capacity. Therefore, a medium or large-sized battery module with a plurality of battery cells electrically connected to each other is used.

Since it is preferable for the medium or large-sized battery module to be manufactured with as small a size and weight as possible, a prismatic battery and a pouch-type battery that may be stacked with high density and have a small weight-to-capacity ratio are mainly used as a battery cell of the medium or large-sized battery module. Meanwhile, in order to protect a cell stacked body from external impact, heat, or vibration, the battery module may include a frame member that accommodates the battery cell stacked body in an internal space with front and rear openings.

FIG. 1 illustrates a perspective view of a battery module provided with a conventional module frame. FIG. 2 illustrates a portion of a cross-sectional view taken along an XZ plane of FIG. 1. FIG. 3 is a drawing of a case in which a welding line in FIG. 2 is misaligned.

Referring to FIG. 1, the battery module may include a module frame 10 provided with front and rear surfaces that are opened to cover a battery cell stacked body formed by stacking a plurality of battery cells, and an end plate 20 covering the front and rear surfaces of the module frame 10. The module frame 10 may include a U-shaped frame 10a and an upper plate 10b covering an opened upper portion of the U-shaped frame 10a. The end plate 20 may include a front plate 20a that covers one side of the module frame 10 and a rear plate 20b that covers the other side of the module frame 10.

To form such a battery module, in a state in which the battery cell stacked body is mounted inside the module frame 10, welding or the like may be performed to couple the U-shaped frame 10a and the upper plate 10b of the module frame 10.

Referring to FIG. 2, a welding portion WP may be formed between the upper plate 10b and a side portion of the U-shaped frame 10a. In this case, in order to form the welding portion WP, it is necessary to fix the U-shaped frame 10a and the upper plate 10b so that bonding surfaces of the side portion of the U-shaped frame 10a and the upper plate 10b are positioned to face each other. However, there is a limit to fixing the U-shaped frame 10a and the upper plate 10b to closely contact each other, and thus, the welding is not smoothly performed.

In addition, although laser welding may be performed for the welding, internal components in addition to battery cells may be damaged due to a laser itself penetrating or weld spatter during the welding process. Referring to FIG. 3, when a welding line is misaligned, since a lot of weld spatter is introduced into the battery module in which the battery cells are disposed, a larger problem may occur.

Therefore, there is a need for a technique that may solve this problem in the prior art.

DISCLOSURE

Technical Problem

The present invention has been made in an effort to provide a battery module and a method and of manufacturing the same that may prevent spatter from being introduced due to welding.

However, the objective of the present invention is not limited to the aforementioned one, and may be extended in various ways within the spirit and scope of the present invention.

Technical Solution

An embodiment of the present invention provides a battery module, including: a first member and a second member that are coupled, wherein the first member and the second member are weld-coupled; a welding portion of the first member and the second member includes a first welding portion formed on the first member and a second welding portion formed on the second member, based on a coupling surface of the first member and the second member; and the first welding portion and the second welding portion have shapes that are asymmetric to each other.

The battery module may further include: a plurality of battery cell stacked bodies, each including a plurality of battery cells; and a module frame accommodating the plurality of battery cell stacked bodies, wherein the module frame may include a U-shaped frame and a plate-shaped plate coupled with the U-shaped frame, the U-shaped frame may include a bottom portion, and two side portions facing each other; and the first member may be the plate-shaped plate, while the second member may be the side portion.

One side surface of the plate-shaped plate and an outer side surface of the side portion that are adjacent to the coupling surface may be formed side by side.

A depression may be formed at one side of the plate-shaped plate, and a coupling surface of the plate-shaped plate and the side portion may be formed in the depression.

The battery module may further include an end plate coupled to the module frame at front and rear surfaces of the battery cell stacked body.

Another embodiment of the present invention provides a method of manufacturing a battery module, including: weld-coupling a first member and a second member that are coupled in directions that cross each other, wherein the weld-coupling of the first member and the second member is performed by laser-welding in a tilted state on a coupling surface of the first member and the second member; and a coupling surface of the first member and the second member relative to a welding irradiation beam and an extension line of an irradiation direction of the welding irradiation beam cross each other.

The method of manufacturing the battery module may further include: mounting a battery cell stacked body in which a plurality of battery cells are stacked on a U-shaped frame with an open upper portion; and covering the battery cell stacked body with a plate-shaped plate at an upper portion of the open U-shaped frame, wherein the weld-coupling of the first member and the second member may include weld-coupling the plate-shaped plate and the U-shaped frame.

The welding irradiation beam may be incident on the U-shaped frame at an angle with respect to the coupling surface.

The U-shaped frame may include a bottom portion, and two side portions facing each other; and the weld-coupling of the plate-shaped plate and the U-shaped frame may be weld-coupling the two side portions and the plate-shaped plate.

One side surface of the plate-shaped plate and an outer side surface of each of the two side portions that are adjacent to the coupling surface may be formed side by side.

The U-shaped frame may include a bottom portion and two side portions facing each other; and in the weld-coupling of the plate-shaped plate and the U-shaped frame, a welding process may be performed where the plate-shaped plate overlaps an upper end of the two side portions.

A depression may be formed at one side of the plate-shaped plate, and a coupling surface of the plate-shaped plate and the U-shaped frame may be formed in the depression.

The weld-coupling of the plate-shaped plate and the U-shaped frame may be performed in an $N_2$ gas atmosphere.

The tilting angle between the coupling surface and the welding irradiation beam may be 13.5 degrees to 21.5 degrees.

The tilting angle between the coupling surface and the welding irradiation beam may be 15 degrees to 20 degrees.

The weld-coupling of the plate-shaped plate and the U-shaped frame may include performing dual beam laser welding based on a gap between the plate-shaped plate and the U-shaped frame.

Advantageous Effects

According to the embodiments, it is possible to prevent spatter from being introduced into a battery module by a tilt welding process. Therefore, it is possible to reduce occurrence of battery cell defects due to welding.

MODE FOR INVENTION

Figure 1:
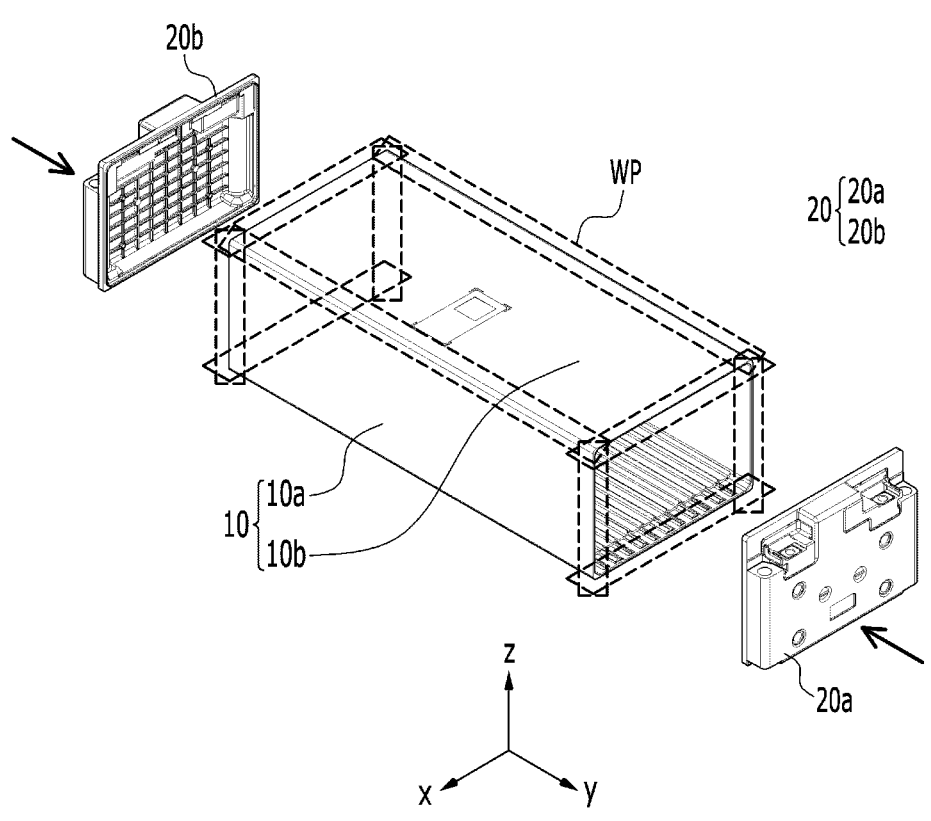
FIG. 1 illustrates a perspective view of a battery module provided with a conventional module frame.
Figure 2:
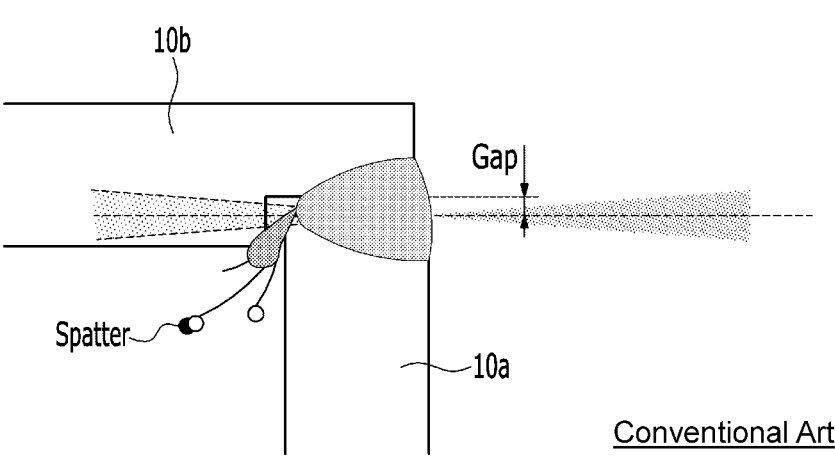
FIG. 2 illustrates a portion of a cross-sectional view taken along an XZ plane of FIG. 1.
Figure 3:
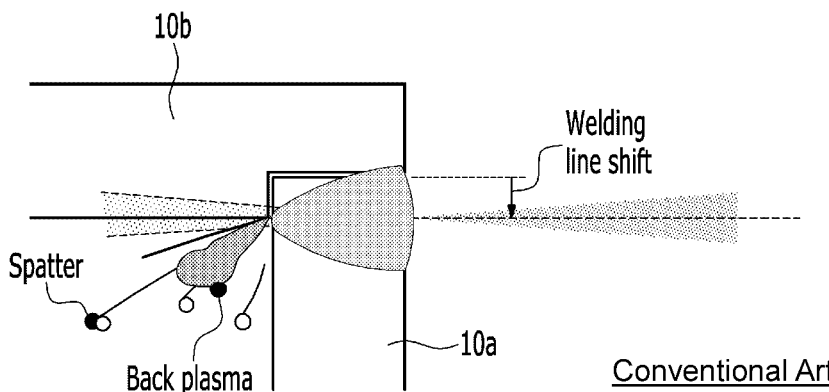
FIG. 3 is a drawing of a case in which a welding line in FIG. 2 is misaligned.

The present invention will be described more fully hereinafter with reference to the accompanying drawings, in which embodiments of the invention are shown. As those skilled in the art would realize, the described embodiments may be modified in various different ways, all without departing from the spirit or scope of the present invention.

In order to clearly describe the present invention, parts or portions that are irrelevant to the description are omitted, and identical or similar constituent elements throughout the specification are denoted by the same reference numerals.

Further, in the drawings, the size and thickness of each element are arbitrarily illustrated for ease of description, and the present disclosure is not necessarily limited to those illustrated in the drawings. In the drawings, the thicknesses of layers, films, panels, regions, areas, etc., are exaggerated for clarity. In the drawings, for ease of description, the thicknesses of some layers and areas are exaggerated.

It will be understood that when an element such as a layer, film, region, area, or substrate is referred to as being "on" another element, it can be directly on the other element or intervening elements may also be present. In contrast, when an element is referred to as being "directly on" another element, there are no intervening elements present. Further, in the specification, the word "on" or "above" means positioned on or below the object portion, and does not necessarily mean positioned on the upper side of the object portion based on a gravitational direction.

In addition, unless explicitly described to the contrary, the word "comprise" and variations such as "comprises" or "comprising" will be understood to imply the inclusion of stated elements but not the exclusion of any other elements.

Further, throughout the specification, the phrase "in a plan view" or "on a plane" means viewing a target portion from the top, and the phrase "in a cross-sectional view" or "on a cross-section" means viewing a cross-section formed by vertically cutting a target portion from the side.

Figure 4:
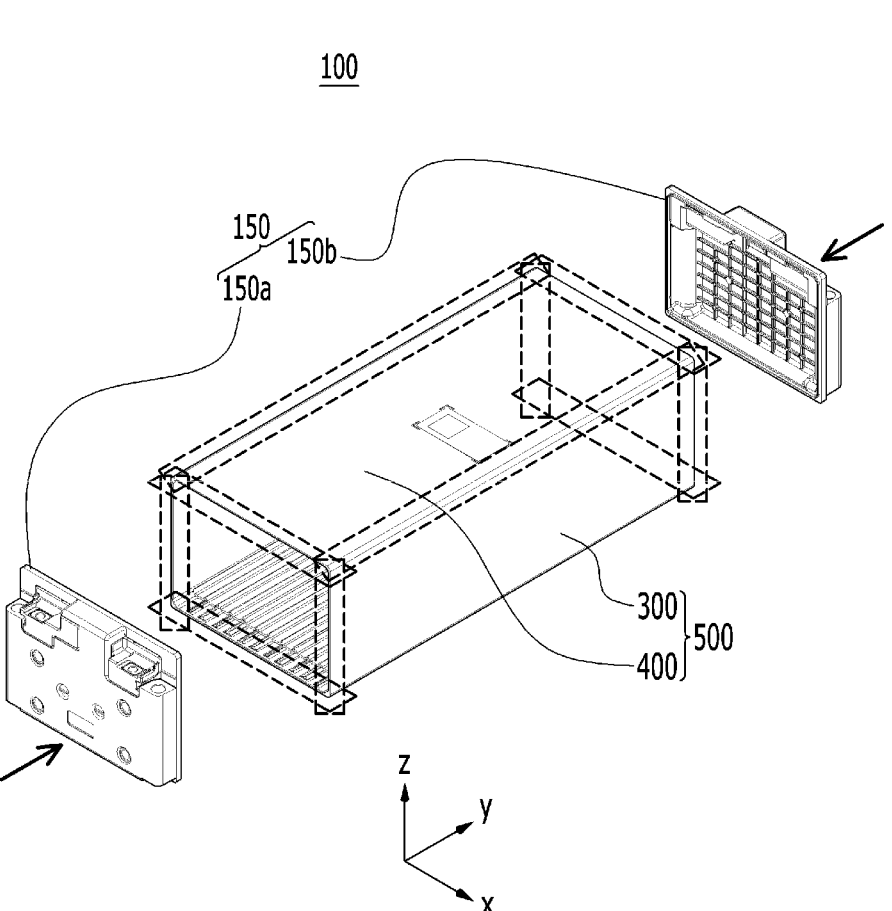
FIG. 4 illustrates a perspective view of a module frame and an end plate in a battery module according to an embodiment of the present invention.
Figure 5:
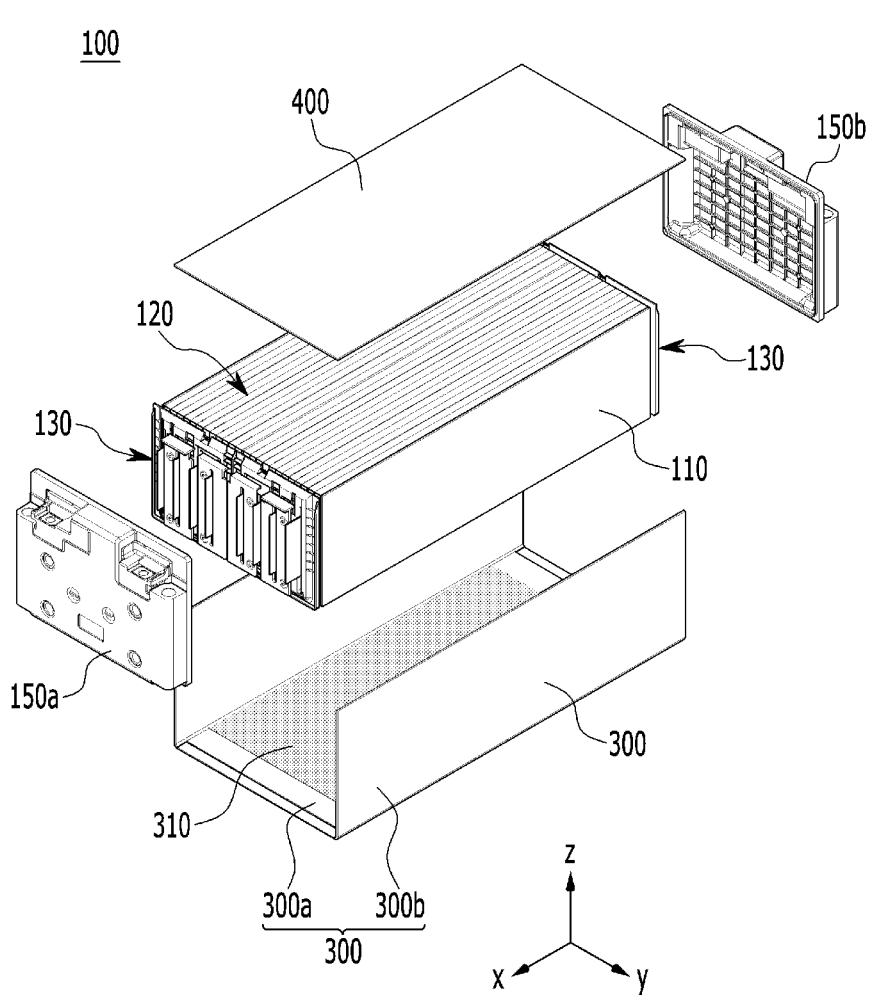
FIG. 5 illustrates an exploded perspective view of a battery module according to an embodiment of the present invention.
Figure 6:
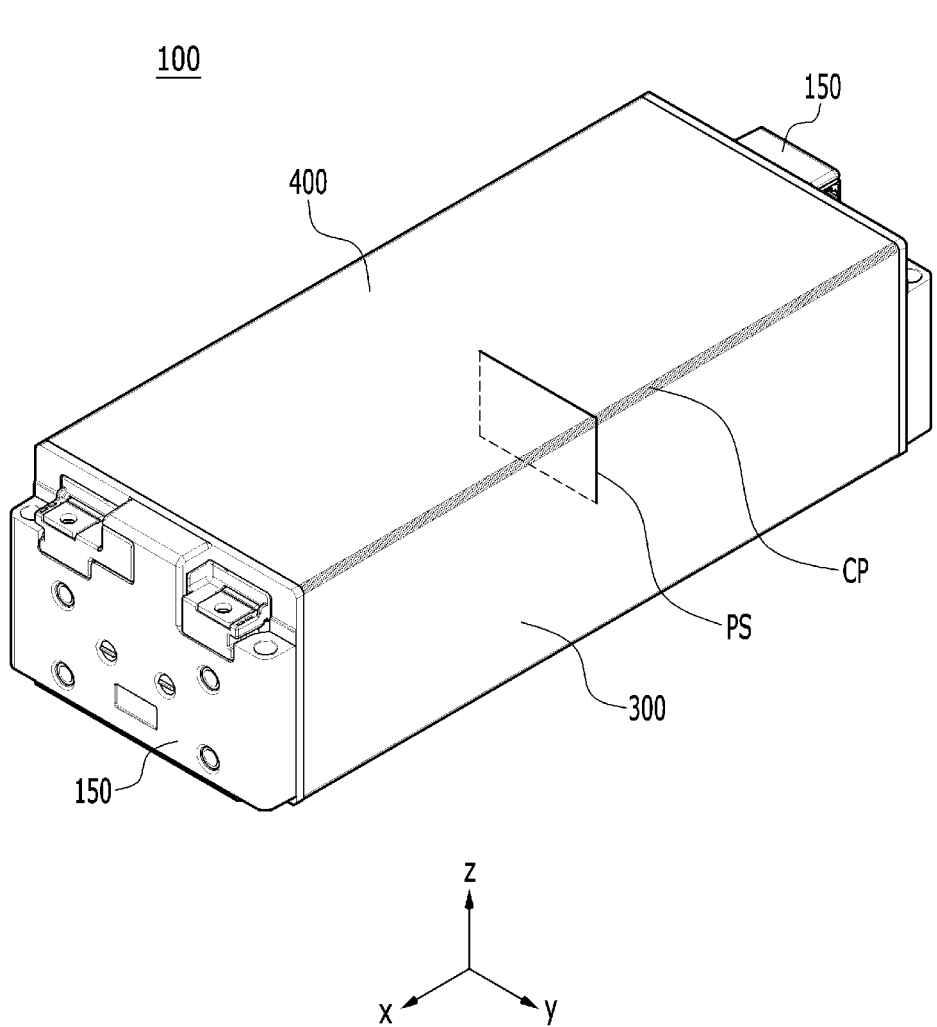
FIG. 6 illustrates a perspective view of a state in which constituent elements of the battery module of FIG. 5 are combined.

FIG. 4 illustrates a perspective view of a module frame and an end plate in a battery module according to an embodiment of the present invention. FIG. 5 illustrates an exploded perspective view of a battery module according to an embodiment of the present invention. FIG. 6 illustrates a perspective view of a state in which constituent elements of the battery module of FIG. 5 are combined.

Referring to FIG. 4, a battery module 100 according to the present embodiment includes a module frame 500 provided with one side and the other side that face each other in one direction and are opened, and an end plate 150 coupled with the module frame 500 at one side and the other side of the module frame 500. The module frame 500 covers a battery cell stacked body in which a plurality of battery cells are stacked and formed except for both sides opened in a y-axis direction.

The module frame 500 according to the present embodiment may include a U-shaped frame 300, and an upper plate 400 covering an open upper portion of the U-shaped frame 300. The end plate 150 may include a front plate 150a that covers one side of the module frame 500, and a rear plate 150b that covers the other side of the module frame 500.

To form this battery module, in a state in which the battery cell stacked body is mounted inside the module frame 500, after the module frame 500 and the end plate 150 are aligned, the front plate 150a and the rear plate 150b may be welded and coupled at corners defining the open one side and the open other side of the module frame 500. As shown in FIGS. 4 and 6, there may be a total of ten coupling portions CP formed by welding.

Referring to FIG. 5 and FIG. 6, the battery module 100 according to the present embodiment includes a battery cell stacked body 120 including a plurality of battery cells 110, a U-shaped frame 300 of which an upper side and front and rear sides are open, an upper plate 400 covering an upper portion of the battery cell stacked body 120, end plates 150 respectively positioned at front and rear surfaces of the battery cell stacked body 120, and a bus bar frame 130 positioned between the battery cell stacked body 120 and the end plates 150a and 150b. In addition, the battery module 100 includes a thermally conductive resin layer 310 positioned between the U-shaped frame 300 and the battery cell stacked body 120. The thermally conductive resin layer 310 is a kind of heat dissipation layer, and may be formed by coating a material having a heat dissipation function.

When both the open sides of the U-shaped frame 300 are referred to as a first side and a second side, respectively, the U-shaped frame 300 has a plate-shaped structure bent so as to continuously cover a front surface, a lower surface, and a rear surface adjacent to each other among the remaining outer surfaces except for surfaces of the battery cell stacked body 120 corresponding to the first side and the second side. The upper surface corresponding to the lower surface of the U-shaped frame 300 is open.

The upper plate 400 has a single plate-shaped structure that covers the remaining upper surface except for the front, lower, and rear surfaces covered by the U-shaped frame 300. Specifically, the U-shaped frame 300 according to the present embodiment includes a bottom portion 300a and two side portions 300b facing each other. The U-shaped frame 300 and the upper plate 400, in a state in which corner portions corresponding to each other are in contact with each other, may form a structure surrounding the battery cell stacked body 120 by being coupled by welding or the like. That is, the U-shaped frame 300 and the upper plate 400 may be formed with a coupling portion CP formed by a coupling method such as welding at the corners corresponding to each other.

Before the battery cell stacked body 120 described in FIG. 5 is mounted on the bottom portion 300a of the U-shaped frame 300, a thermally conductive resin may be applied to the bottom portion 300a of the U-shaped frame 300, and the thermally conductive resin may be cured to form a thermally conductive resin layer 310.

Before the thermally conductive resin layer 310 is formed, that is, before the applied thermally conductive resin is cured, the battery cell stacked body 120 may be mounted on the bottom portion 300a of the U-shaped frame 300 while moving in a direction perpendicular to the bottom portion 300a of the U-shaped frame 300. Thereafter, the thermally conductive resin layer 310 formed by curing the thermally conductive resin is positioned between the bottom portion 300a of the U-shaped frame 300 and the battery cell stacked body 120. The thermally conductive resin layer 310 may serve to transmit heat generated in the battery cell 110 to the bottom of the battery module 100 and to fix the battery cell stacked body 120.

The battery cell stack 120 may include a plurality of battery cells 110 stacked in one direction, and the plurality of battery cells 110 may be stacked in a Y-axis direction as shown in FIG. 5. In other words, the direction in which the plurality of battery cells 110 are stacked may be the same as a direction in which two side portions of the U-shaped frame 300 face each other. The battery cell 110 is preferably a pouch-type of battery cell.

Widths of the side portion 300b of the U-shaped frame 300 and the upper plate 400 according to the present embodiment may be the same as each other. In other words, an edge portion extending along an X-axis direction from the upper plate 400 and an edge portion extending along the X-axis direction from the side portion 300b of the U-shaped frame 300 may directly contact to be coupled by a method such as welding.

Hereinafter, a manufacturing method and a structure of a battery module according to an embodiment of the present invention will be described with reference to FIG. 7 to FIG. 11.

Figure 7:
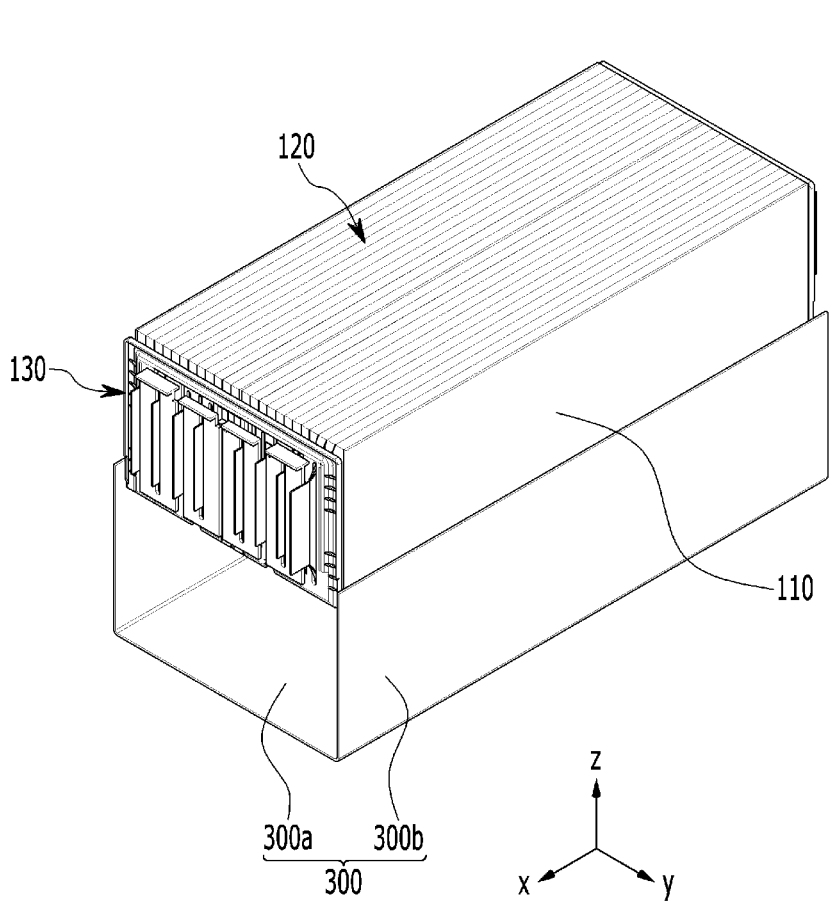
FIG. 7 to FIG. 11 are drawings of a method of manufacturing a battery module according to an embodiment of the present invention.

Referring to FIG. 7, the method of manufacturing the battery module according to the present embodiment includes stacking the battery cell stacked body 120 on the bottom portion 300a of the U-shaped frame 300 with an open upper portion. In this case, in a direction (Z-axis direction) perpendicular to the stacking direction of the plurality of battery cells 110 included in the battery cell stacked body 120, it is preferable that the battery cell stacked body 120 is inserted at the bottom portion 300a of the U-shaped frame 300.

The method of manufacturing the battery module according to the present embodiment may further include, before mounting the battery cell stacked body 120 on the bottom portion 300a of the U-shaped frame 300, coupling the battery cell stacked body 120 and the bus bar frame 130 while moving the bus bar frame 130 in a direction opposite to a direction in which an electrode lead of the battery cell 110 included in the battery cell stacked body 120 protrudes. Additionally, the method of manufacturing the battery module may further include applying a thermally conductive resin to the bottom portion 300a of the U-shaped frame 300 before mounting the battery cell stacked body 120 on the bottom portion 300a of the U-shaped frame 300.

Figure 8:
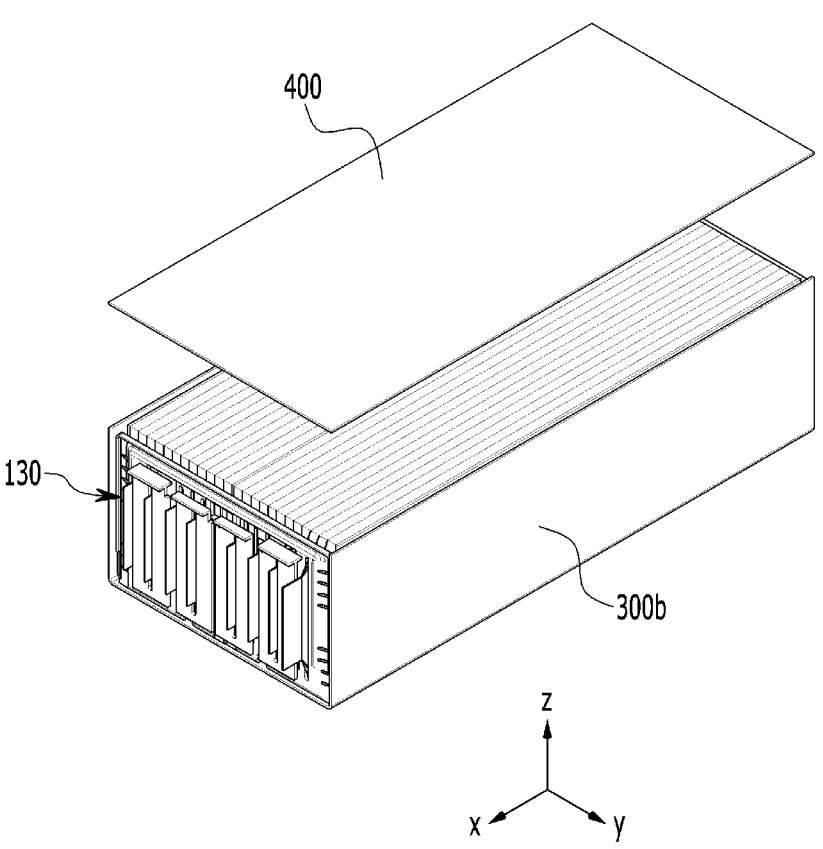

Referring to FIG. 8, the method of manufacturing the battery module according to the present embodiment includes mounting the upper plate 400 on the upper portion of the open U-shaped frame 300 so as to cover the battery cell stacked body 120. In the present embodiment, the upper plate 400 is disposed adjacent to the upper portion of the U-shaped frame 300 in the Z-axis direction, which is a vertical direction, and then they may be combined by a method such as welding to form the battery module as shown in FIG. 6. However, the present invention is not limited to this method, and in a modified embodiment, after placing the plate-shaped lower plate on the floor and then mounting the battery cell stacked body 120 on the lower plate, a U-shaped frame with an open lower portion may cover the battery cell stacked body 120. In this case, the thermally conductive resin layer formed by applying the thermally conductive resin described above may be formed between the lower plate and the battery cell stacked body 120. In the present embodiment, after disposing the lower portion of the U-shaped frame of which lower portion is open in the Z-axis direction, which is a vertical direction, to be adjacent to the lower plate, they may be coupled by a method such as welding.

Hereinafter, a welding method according to the present embodiment will be described with reference to FIG. 9 and FIG. 10.

Figure 9:
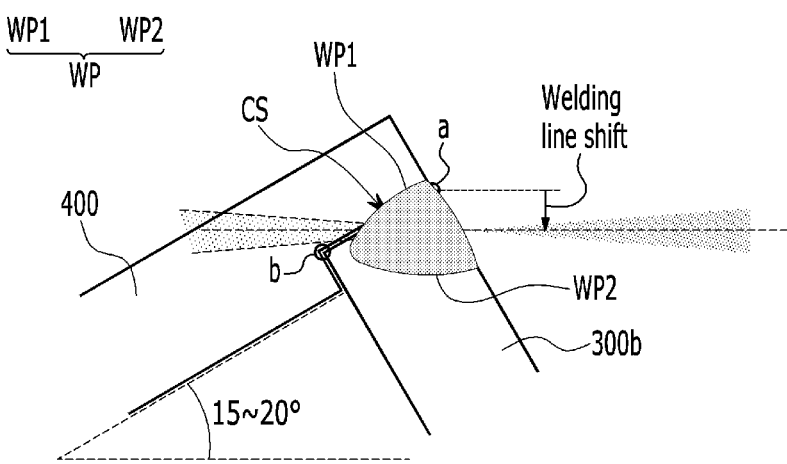

FIG. 9 illustrates a partial cross-sectional view taken along a cut surface PS of FIG. 6. FIG. 10 illustrates a cross-sectional view of a depression of the upper plate of FIG. 9.

Referring to FIG. 9, in the welding of the upper plate 400 and the side portion 300*b* of the U-shaped frame, the welding process may be performed in a state in which the upper plate 400 overlaps an upper end of the side portion 300*b*. According to a modified embodiment, the structure of the module frame including the upper plate 400 and the U-shaped frame 300 described above may be replaced with a structure of a module frame including a plate-shaped lower plate and a U-shaped frame with an open lower portion.

According to the present embodiment, in the welding of the upper plate 400 and the side portion 300*b* of the U-shaped frame, laser welding may be performed in a state in which a coupling surface CS between the upper plate 400 and the side portion 300*b* of the U-shaped frame is tilted relative to the welding line. Alternatively, in a state in which the module frame 500 including the upper plate 400 and the U-shaped frame 300 is fixed, laser welding may be performed by tilting a laser optical system itself emitting a welding irradiation beam.

In this case, the coupling surface CS between the upper plate 400 and the side portion 300*b* of the U-shaped frame and an extension line of an irradiation direction of the welding irradiation beam may cross each other. The welding irradiation beam may pass between a first point (a) and a second point (b) shown in FIG. 9. The first point (a) is a portion positioned at the outermost portion of the coupling surface CS, and the second point (b) is a portion positioned at the innermost portion of the coupling surface CS. The welding irradiation beam may have an angle that is tilted to have a range passing between the first point (a) and the second point (b). According to the present embodiment, the tilting angle may be approximately 15 degrees to 20 degrees.

The welding irradiation beam may be incident on the side portion 300*b* of the U-shaped frame at a shifted position with respect to the coupling surface CS. The shifted position is a position that is moved in a downward direction of the side portion 300*b* of the U-shaped frame with respect to the upper plate 400. As the welding irradiation beam is incident at a position shifted downward from the coupling surface CS, the possibility that the welding line passes through the coupling surface CS increases. Therefore, even if the welding line is misaligned, it is possible to minimize the possibility of spatter being introduced into the battery module as well as form a welding portion to have sufficient tensile strength around the coupling surface CS.

Figure 12:
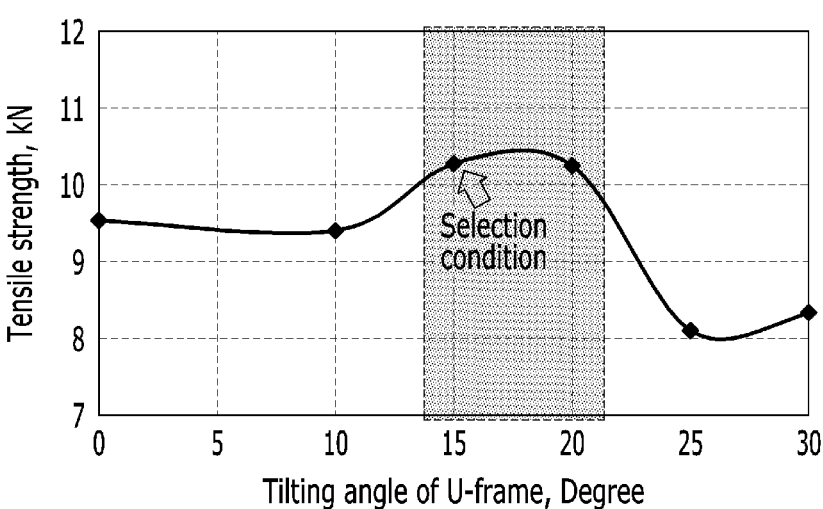
FIG. 12 illustrates a graph of tensile strength according to a tilting angle in a method of manufacturing a battery module according to an embodiment of the present invention.

FIG. 12 illustrates a graph of tensile strength according to a tilting angle in a method of manufacturing a battery module according to an embodiment of the present invention.

Referring to FIG. 12, since the tensile strength is 10 kN or more in a range of the tilting angle of 13.5 degrees to 21.5 degrees, it may have a strong tensile strength that may sufficiently withstand an external impact. Preferably, the tilting angle may be 15 to 20 degrees.

The welding of the upper plate 400 and the side portion 300*b* of the U-shaped frame may be performed in an N₂ gas atmosphere. When welding is performed in the N₂ gas atmosphere, it is possible to reduce spatter from being introduced into the inside thereof.

According to the present embodiment, the welding may be laser welding, and as a modified embodiment, dual-beam laser welding may be performed based on a gap between the upper plate 400 and the side portion 300*b* of the U-shaped frame.

Referring back to FIG. 9, according to the present embodiment, the welding portion WP between the upper plate 400 and the side portion 300*b* includes a first welding portion WP1 formed on the upper plate 400 and a second welding portion WP2 formed on the side portion 300*b*, based on the coupling surface CS of the upper plate 400 and the side portion 300*b*. In this case, the first welding portion WP1 and the second welding portion WP2 have asymmetric shapes.

One side surface of the upper plate 400 and an outer side surface of the side portion 300*b* that are adjacent to the coupling surface CS may be formed side by side. In other words, as shown in FIG. 9, one side surface of the upper plate 400 and the outer side surface of the side portion 300*b* of the U-shaped frame may be disposed on the same plane. However, the present invention is not limited to completely positioning on the same plane.

Figure 10:
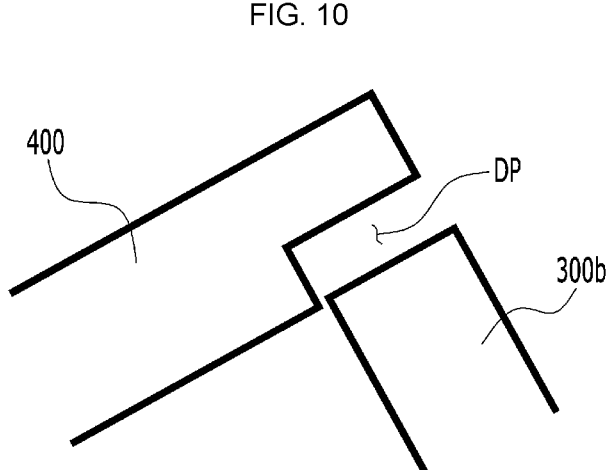

Referring to FIG. 10, a depression DP may be formed at one side of the upper plate 400, and the coupling surface CS between the upper plate 400 and the side surface 300*b* shown in FIG. 9 may be formed in the depression DP.

Figure 11:
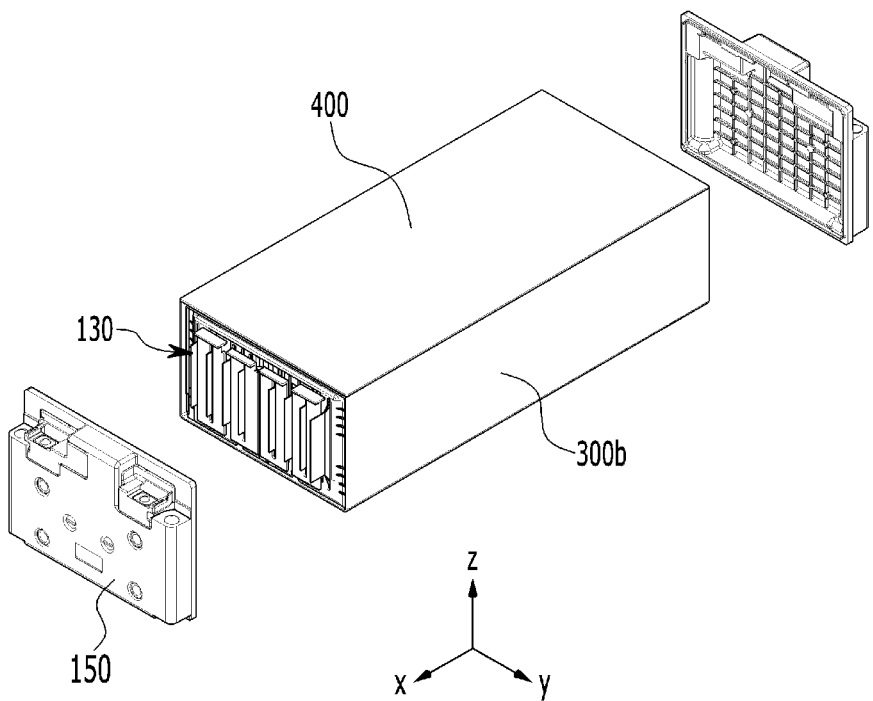

Referring to FIG. 11, the method of manufacturing the battery module according to the present embodiment includes coupling the upper plate 400 and the side portion 300*b* of the U-shaped frame, and coupling the end plate 150 to each of the open both sides of the U-shaped frame. The tilting welding according to the present embodiment is unnecessary for welding the end plate 150 and the module frame. This is because a separate anti-spatter guard may be formed between the end plate 150 and the module frame to prevent the spatter from being introduced.

In the above, the welding-coupled structure of the side portion 300*b* of the U-shaped frame 300 and the upper plate 400 has been described as an example, but as a modified embodiment, the present invention may also be applied to a welding-coupled structure of a first member and a second member that are coupled in directions crossing each other.

On the other hand, one or more battery modules according to the embodiment of the present invention may be packaged in a pack case to form a battery pack.

The above-described battery module and the battery pack including the same may be applied to various devices. These devices may be applied to a vehicle such as an electric bicycle, an electric vehicle, or a hybrid vehicle, but the present invention is not limited thereto, and may be applied to various devices that can use a battery module and a battery pack including the same, and this is also included in the scope of the present invention.

While this invention has been described in connection with what is presently considered to be practical embodiments, it is to be understood that the invention is not limited to the disclosed embodiments, but, on the contrary, is intended to cover various modifications and equivalent arrangements included within the spirit and scope of the appended claims.

Partial Description of Symbols

300: U-shaped frame
300*a*: bottom portion
300*b*: side portion
400: upper plate
500: module frame

The invention claimed is:

1. A battery module, comprising:

a plurality of battery cell stacked bodies, each including a plurality of battery cells; and a module frame accommodating the plurality of battery cell stacked bodies, wherein the module frame includes a frame, and a plate-shaped plate coupled with the frame, wherein the frame includes a bottom portion, and a first side portion and a second side portion, the first and second side portions facing each other, wherein the plate-shaped plate and the first side portion and the second side portion are weld-coupled by laser welding where a welding irradiation beam is oriented other than parallel to a first coupling surface of the plate-shaped plate and the first side portion and to a second coupling surface of the plate-shaped plate and the second side portion, wherein a welding portion of the plate-shaped plate and the first side portion and a welding portion of the plate-shaped plate and the second side portion each include a first welding portion formed on the plate-shaped plate and a second welding portion formed on the respective side portions, based on the respective coupling surfaces of the plate-shaped plate and the side portions, wherein the first welding portion and the second welding portion have shapes that are asymmetric to each other, wherein a depression is located at a first side surface and a second side surface of the plate-shaped plate, and the first coupling surface and the second coupling surface are formed in the depression, and wherein an outermost edge of the depression corresponds to an outermost edge of the respective side portions.

2. The battery module of claim 1, wherein the first side surface of the plate-shaped plate and an outer side surface of the first side portion that is adjacent to the first coupling surface are formed side by side.

3. The battery module of claim 1, further comprising an end plate coupled to the module frame at front and rear surfaces of the plurality of battery cell stacked bodies.

4. A method of manufacturing the battery module of claim 1, the method comprising weld-coupling the plate-shaped plate and the first side portion in directions that cross each other, and the plate-shaped plate and the second side portion in directions that cross each other, wherein the weld-coupling of the plate-shaped plate and the first side portion and the plate-shaped plate and the second side portion is performed by laser welding in a tilted state on the first coupling surface and the second coupling surface relative to the welding irradiation beam, wherein the first coupling surface and the second coupling surface and an extension line of an irradiation direction of the welding irradiation beam cross each other, and wherein the plate-shaped plate and the first side portion and the plate-shaped plate and the second side portion are each weld-coupled by laser welding where the welding irradiation beam is oriented other than parallel to the respective first coupling surface and the second coupling surface.

5. The method of claim 4, further comprising:

mounting a battery cell stacked body in which a plurality of battery cells are stacked between the frame and the plate-shaped plate.

6. The method of claim 5, wherein the welding irradiation beam is incident on the frame at an angle with respect to the coupling surface.

7. The method of claim 4, wherein one side surface of the plate-shaped plate and an outer side surface of each of the two side portions that are adjacent to the coupling surface are formed side by side.

8. The method of claim 5, wherein the frame includes a bottom portion, and in the weld-coupling of the plate-shaped plate and the frame, a welding process is performed where the plate-shaped plate overlaps an upper end of the two side portions.

9. The method of claim 5, wherein the weld-coupling of the plate-shaped plate and the frame is performed in an $N_2$ gas atmosphere.

10. The method of claim 5, wherein a tilting angle between the coupling surfaces and the welding irradiation beam is 13.5 degrees to 21.5 degrees.

11. The method of claim 10, wherein a tilting angle between the coupling surfaces and the welding irradiation beam is 15 degrees to 20 degrees.

12. The method of claim 5, wherein the weld-coupling of the plate-shaped plate and the frame includes performing dual beam laser welding based on a gap between the plate-shaped plate and the frame.

* * * * *